United States Patent
Vadde et al.

(10) Patent No.: US 7,262,929 B2
(45) Date of Patent: Aug. 28, 2007

(54) SETTING THE ROTATION SPEED OF A ROTATING DISK MEMORY

(75) Inventors: Venkatesh Vadde, Fremont, CA (US); Jakke Mäkelä, Turku (FI); Jukka-Pekka Vihmalo, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/514,085

(22) PCT Filed: Apr. 15, 2003

(86) PCT No.: PCT/IB03/01467

§ 371 (c)(1),
(2), (4) Date: Jun. 15, 2005

(87) PCT Pub. No.: WO03/096335

PCT Pub. Date: Nov. 20, 2003

(65) Prior Publication Data

US 2005/0240684 A1     Oct. 27, 2005

(30) Foreign Application Priority Data

May 13, 2002   (EP) ................................. 02010142

(51) Int. Cl.
*G11B 15/46* (2006.01)
(52) U.S. Cl. ................................................. 360/73.03
(58) Field of Classification Search ................. 360/55, 360/69, 74.4, 75, 73.03; 369/47.41, 47.24, 369/53.18, 53.2, 44.27
See application file for complete search history.

(56) References Cited

U.S. PATENT DOCUMENTS

| 4,593,329 A * | 6/1986 | Hayakawa | 360/75 |
|---|---|---|---|
| 4,943,907 A | 7/1990 | Godwin | 360/74.4 |
| 4,984,227 A * | 1/1991 | Yoshimaru | 369/47.41 |
| 5,825,572 A | 10/1998 | Morita | 360/69 |
| 5,963,517 A * | 10/1999 | Nakagaki et al. | 369/53.14 |
| 6,031,801 A * | 2/2000 | Ishikawa et al. | 369/47.24 |
| 6,762,983 B1 * | 7/2004 | Andoh | 369/47.4 |
| 6,804,183 B2 * | 10/2004 | Ikeda et al. | 369/53.37 |
| 6,876,606 B2 * | 4/2005 | Kajino et al. | 369/44.27 |
| 2002/0172115 A1 * | 11/2002 | Tsukihashi | 369/53.18 |
| 2003/0099176 A1 * | 5/2003 | Okada | 369/53.18 |
| 2003/0123354 A1 * | 7/2003 | Takahashi | 369/53.2 |

FOREIGN PATENT DOCUMENTS

EP       1168326       1/2002

* cited by examiner

*Primary Examiner*—Fred F. Tzeng
(74) *Attorney, Agent, or Firm*—Ware, Fressola, Van Der Sluys & Adolphson, LLP

(57) ABSTRACT

The invention relates to a device comprising a disk drive 1 for rotating a disk memory and at least one interface enabling a data flow between a rotating disk memory and at least one other module 10, 12. In order to enable a comfortable use of such a device, it is proposed that the device further comprises means 2 for setting the rotation speed of the disk drive 1 based on an indication of the data rate supported by an interface of the device, which interface is currently to be employed for enabling a data flow between the rotating disk memory and at least one other module 10, 12. The invention relates equally to a method setting the rotation speed of a disk drive 1 according to the capabilities of an interface enabling a data flow between a disk memory rotated by the disk drive 1 and another module 10, 12.

20 Claims, 4 Drawing Sheets

SETTING THE ROTATION SPEED OF A ROTATING DISK MEMORY

CROSS-REFERENCE TO RELATED APPLICATION

This is the U.S. National Stage of International Application PCT/IB2003/001467 filed Apr. 15, 2003 published under International Publication Number WO 03/096335 A1 and claiming priority from European Patent Application Number 02010142.4 filed May 13, 2002.

FIELD OF THE INVENTION

The invention relates to a device comprising a disk drive for rotating a disk memory and at least one interface enabling a data flow between a disk memory rotated by the disk drive and at least one other module. The invention relates equally to a method for setting the rotation speed of a disk drive of such a device.

BACKGROUND OF THE INVENTION

It is well known from the state of the art that rotating disk based memories like hard disk drives (HDD) or optical disks are employed for storing data. Data can be written into such a disk memory or read from such a disk memory while it is rotated by a disk drive of some device. Data that is to be stored in the rotating disk memory can be provided by some module internal or external to the device. Equally, a module internal or external to the device might require data that is stored in the rotating disk memory. Such modules can be connected to the rotating disk memory via an interface enabling a corresponding data flow.

In devices comprising different interfaces to a disk memory rotated by a disk drive, which interfaces support different data rates, a buffer is required in order to be able to store data read from the rotating disk memory with a data rate exceeding the data rate supported by the slower interfaces. This buffer is usually realized as a non-volatile buffer.

In particular with handheld devices which are powered by small batteries, it is necessary to keep the power consumption as low as possible in order to enable a long operation without the need to exchange or recharge the battery. It is also desirable to keep the number and/or size of the components of the device as small as possible, in order to be able to provide a small and light device for a maximum comfort for the user of the device and in order to minimize the costs of the device.

SUMMARY OF THE INVENTION

It is primarily an object of the invention to enable a low power consumption, while avoiding disadvantageous effects on the operation of the device. It is further an object of the invention to reduce the number or size of the components of the device. It is also an object of the invention to improve the comfort in using a device comprising a disk drive for rotating a disk memory.

This object is reached on the one hand with a device comprising a disk drive for rotating a disk memory and with at least one interface enabling a data flow between a disk memory rotated by the disk drive and at least one other module. The proposed device further comprises means for setting the rotation speed of the disk drive based on an indication of the data rate supported by an interface of the device, which interface is currently to be employed for enabling a data flow between the rotating disk memory and at least one other module.

On the other hand, the object of the invention is reached with a method for setting the rotation speed of a disk drive of such a device. The proposed method comprises as a first step determining a rotation speed for the disk drive based on an indication of the data rate supported by an interface of the device, which interface is currently to be employed for enabling a data flow between the disk memory and at least one other module. In a second step of the proposed method, the rotation speed of the disk drive is then set to the determined rotation speed.

The invention proceeds from the consideration that the effective data rate of the data read from or written to a rotating disk memory relates to the rotation speed of the disk memory, and that therefore, it is possible to achieve an optimal co-operation between a rotating disk memory and an interface, if the respective rotation speed is adapted to the capabilities of the employed interface. The effective data rate of the disk memory can be adjusted in particular such that it is always close to the effective data rate of the currently employed interface.

It is an advantage of the invention that it results in a lower power consumption while employing interfaces supporting only a low data rate. This leads to a longer battery use time. At the same time, it is ensured that interfaces supporting a high data rate, e.g. wired interfaces, can be used for data transmissions with this high data rate.

It is moreover an advantage of the invention that it minimizes the need for buffer space, since with an adjusted rotation speed, it is no longer necessary to buffer data read from the disk memory for slow interfaces. The invention therefore eliminates the need for a non-volatile buffer. This allows for the removal of one component from the system and thus to reduce the cost and size of the device. A volatile cache will be sufficient for handling irregularities in the data traffic.

Finally, it is an advantage of the invention that it provides a new freedom in the design of signal-processing algorithms, where the same software and hardware can be employed in different embodiments of a communication device according to the invention. This leads to further savings in cost, size and complexity. For example, the same software and/or hardware for controlling the disk memory can be used for devices comprising only a slow interface, for devices comprising only a fast interface and for devices comprising slow and fast interfaces, since in each case the rotation speed is adjusted automatically to the optimum value for the respectively used interface. In case the device has both a slow and a fast interface the disk memory will be operated at two speeds, a high speed resulting in a high data rate for the fast interface, in order to improve the usability, and a low speed resulting in a low data rate for the slow interface, in order to decrease the power consumption.

A device according to the invention comprising only a single interface can be considered to constitute a special case of the general embodiment with multiple interfaces. A device with a single interface has the advantage that its hardware can be realized in a particularly simple way, and that the required overhead of transmissions can be much smaller. Further, it is possible to optimize the energy required much better, since the speed of the drive does not have to be changed.

The disk memory that is rotated by the disk drive of the device can be for example a hard disk drive or an optical disk.

At least one interface of the device can be a wired interface or a wireless interface. A wired interface, e.g. a USB (Universal Serial Bus) interface, will usually be faster than a wireless interface, like a Bluetooth™ interface. It is to be noted that USB and Bluetooth™ are only exemplary interfaces. The invention can equally be employed with any other interface.

The indication of the data rate supported by the respective interface can be provided to the means for adjusting the rotation speed, e.g. by an indication of the type of the interface for which the supported data rate is known. The means for adapting the rotation speed of the disk memory may comprise in particular a servo driver controlling the rotation speed of the disk drive.

In a preferred embodiment of the invention, the rotation speed of the disk memory is varied by a servo driver according to a rotation profile which is either defined by software or hard-coded into the servo driver. The rotation profile associates a respective indication of the data rate supported by an interface to a respective rotation speed to be employed for a disk memory. In case a software external to the servo driver is employed, the software forwards the determined rotation speed to the servo driver for adjusting the rotation speed of the disk drive.

In one special embodiment of the invention, all possible applications for which a data flow may be desired are divided into a plurality of classes, based on the data-rate requirements of the respective application. The class of the respective application is then taken into account in addition, when determining the rotation speed. Preferably, the applications are divided into 2-3 classes, and the disk speed is set accordingly to one of 2-3 different values depending on the class of the particular running application. This embodiment of the invention can be implemented in a variety of ways. In a first possible implementation, the required class information is included as an extra field in a file allocation table. In a second possible implementation, a mirror copy of a file allocation table is created in a non-volatile memory, which memory holds the normal file allocation table data in addition to a field associating the files to a respective class. The mirror file allocation table is then used to access the data. The mirror file allocation table and the actual file allocation table have to be kept synchronized. In a third possible implementation, the required class information is derived from file attributes, when the system receives the command to access a file, e.g. the file extension. The other module or modules connected to the disk memory via an interface can either be comprised in a device according to the invention, or be external to such a device.

The device and the method according to the invention may support a one-to-one connection, i.e. a connection between the device and one other module, or a one-to-many connection, i.e. a connection between the device and several other modules. It is an advantage of a device and a method realizing a one-to-one connection that they will be significantly simpler.

The device can further be a stand-alone system or part of a larger system, like a mobile phone. In the latter case, a connection possibility for other components of the system to the device will usually be required, in order to enable communications within the system.

The most simple realization of the invention is achieved with a stand-alone device comprising only a single interface which is employed exclusively for one-to-one connections.

In a preferred embodiment of the invention, a queue control algorithm is used to optimize the usage of the disk memory. For example, it would be disadvantageous to switch rotation speeds quickly, since this requires much energy. Therefore, it is proposed to employ a queue control algorithm for grouping those operations together which require the same speed. This should be balanced against the user wait times, in which such a grouping can result. Another approach could be to arrange data transfers concerning the same module in a consecutive order in the queue.

In devices comprising only a single interface, there is no need for queue-control algorithms to optimize the energy, since the energy is always the same. However, even in this case there could be a queue control to handle requests that have different urgencies.

The queue control algorithm can also be simplified for a device comprising a plurality of interfaces, in case there is a restriction that only one interface can operate at a time. Such a restriction would avoid the need to group transmissions requiring the same speed together. The most flexible queuing algorithm has thus three modes, a BT-only mode, an USB-only mode and a joint BT and USB mode. All the other software can be shared in the three modes.

The device according to the invention can be any device that enables the use of a rotating disk memory. The invention is of a particular advantage for handheld devices like mobile terminals.

BRIEF DESCRIPTION OF THE FIGURES

Other objects and features of the present invention will become apparent from the following detailed description considered in conjunction with the accompanying drawings, wherein.

DETAILED DESCRIPTION OF THE INVENTION

Figure 1:
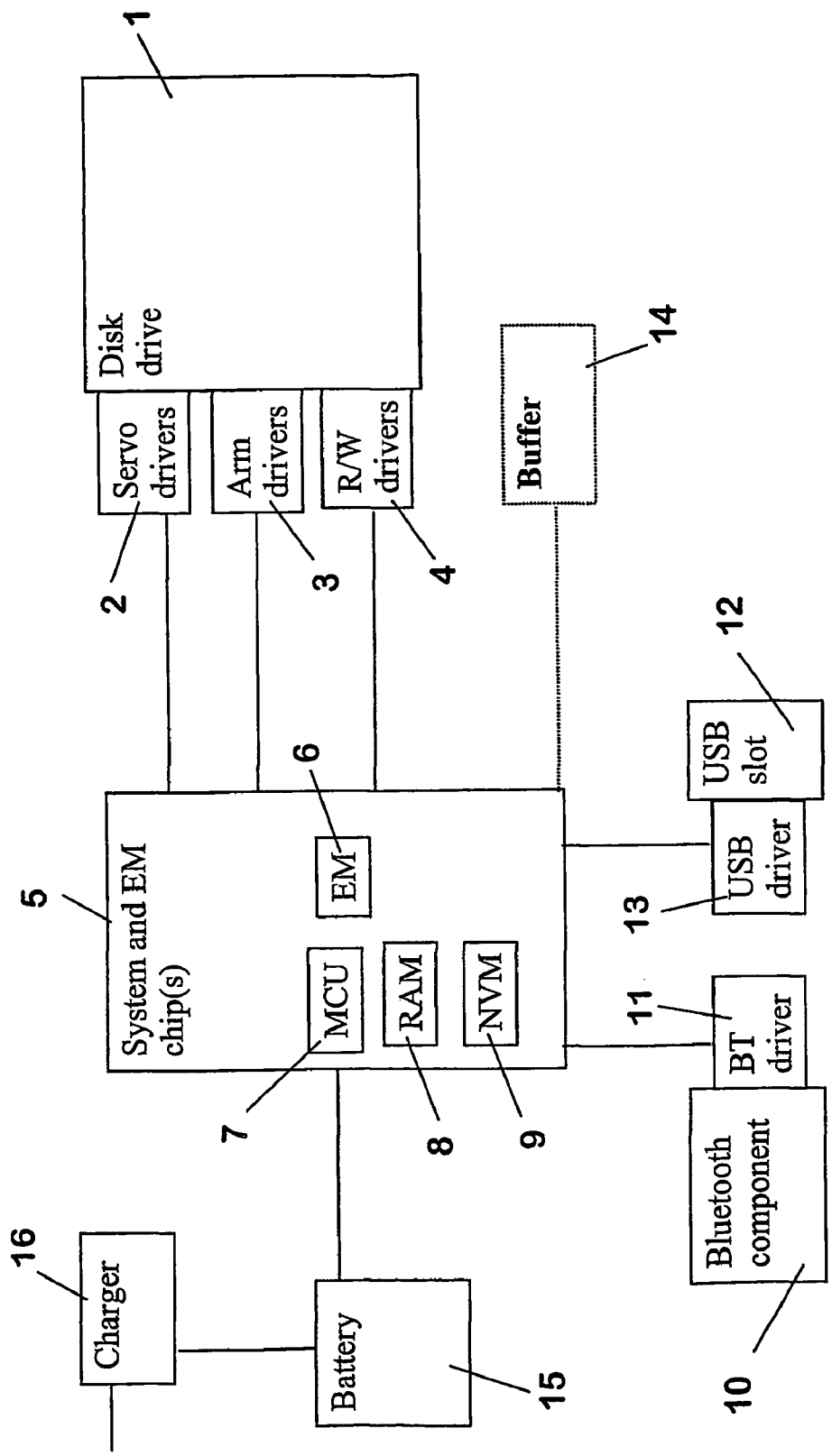
FIG. 1 schematically shows the physical architecture of a system comprising an embodiment of the device according to the invention.

FIG. 1 shows a system comprising an embodiment of a device according to the invention and two modules connected to the device. The device can be for example a mobile terminal of a first user, and the modules can be mobile terminals of other users.

The device comprises a disk drive 1 for rotating a rotating disk memory. The disk drive 1 is controlled by servo drivers 2, arm drivers 3 and R/W (read/write) drivers 4. The servo drivers 2 control the rotation speed of the disk drive 1, while the arm drivers control read/write heads used for reading data from and writing data to a rotating disk memory. The R/W drivers 4 control the actual reading of data from a disk memory and writing data to a disk memory. Servo drivers 2, arm drivers 3 and RJW drivers 4 are further connected to system and Energy Management chip or chips 5. The operational mode of the connection between the servo drivers 2 and the system and EM chip 5 can be "sleep", "idle", "seek", or "rotating". The operational mode of the connection between the arm drivers 3 and the system and EM chip 5 can be "sleep", "idle" or "seeking". The operational mode of the connection between the R/W drivers 4 and the system and EM chip 5 can be "sleep", "idle" or "R/W".

The system and EM chip 5 comprises an energy management (EM) part 6, a microcontroller unit (MCU) 7, a random access memory (RAM) 8 and a nonvolatile memory (NVM) 9, e.g. a flash memory.

The EM part 6 provides a wireless interface for connecting modules supporting Bluetooth™ to the device and a USB interface for connecting modules via USB to the device. In FIG. 1, a Bluetooth™ component 10 is connected to the device via a Bluetooth™ driver 11 included in the Bluetooth™ component 10. Further, a second module 12 comprising a USB slot is connected to the device via a USB driver 13 included in the second module 12. The operational mode of the connection between the EM part 6 and the Bluetooth™ component 10 can be "sleep", "monitor" or "RX/TX" (receiving/transmitting). The same operational modes are available for the connection between the EM part 6 and the USB module 12.

The MCU 7 constitutes processing means controlling the data flow between a disk memory rotated by the disk drive 1 and modules 10, 12 connected to the system and EM chip 5 via the Bluetooth™ interface or the USB interface.

The system and EM chip 5 is moreover connected to a non-volatile buffer 14, which is depicted in FIG. 1 with dotted lines. Also the connection of the buffer 14 to the system and EM chip 5 is depicted with a dotted line. The dotted lines indicate that the buffer 14 is either extremely small or even missing. The operational mode of the connection between the system and EM chip 5 and the buffer 14, if present, can be "sleep" or "ready".

Finally, the system and EM chip 5 is connected for their power supply to a battery 15. The operational mode of this connection can be "off", "sleep" or "full power". The battery 15 can be removable or fixed to the device. The battery 15 can be connected to an external charger 16 for recharging the battery 15. The operational mode of the connection between the battery 15 and the charger 16 can thus be either "off" or "charging".

In case the device is a mobile terminal as suggested above, additional components of the mobile terminal preferably connect to the system and EM chips 5 of the device for enabling communications within the mobile terminal. Such a connectivity is not required in a case where the device is a stand-alone device provided exclusively for providing an access to the disk drive 1.

Figure 2:
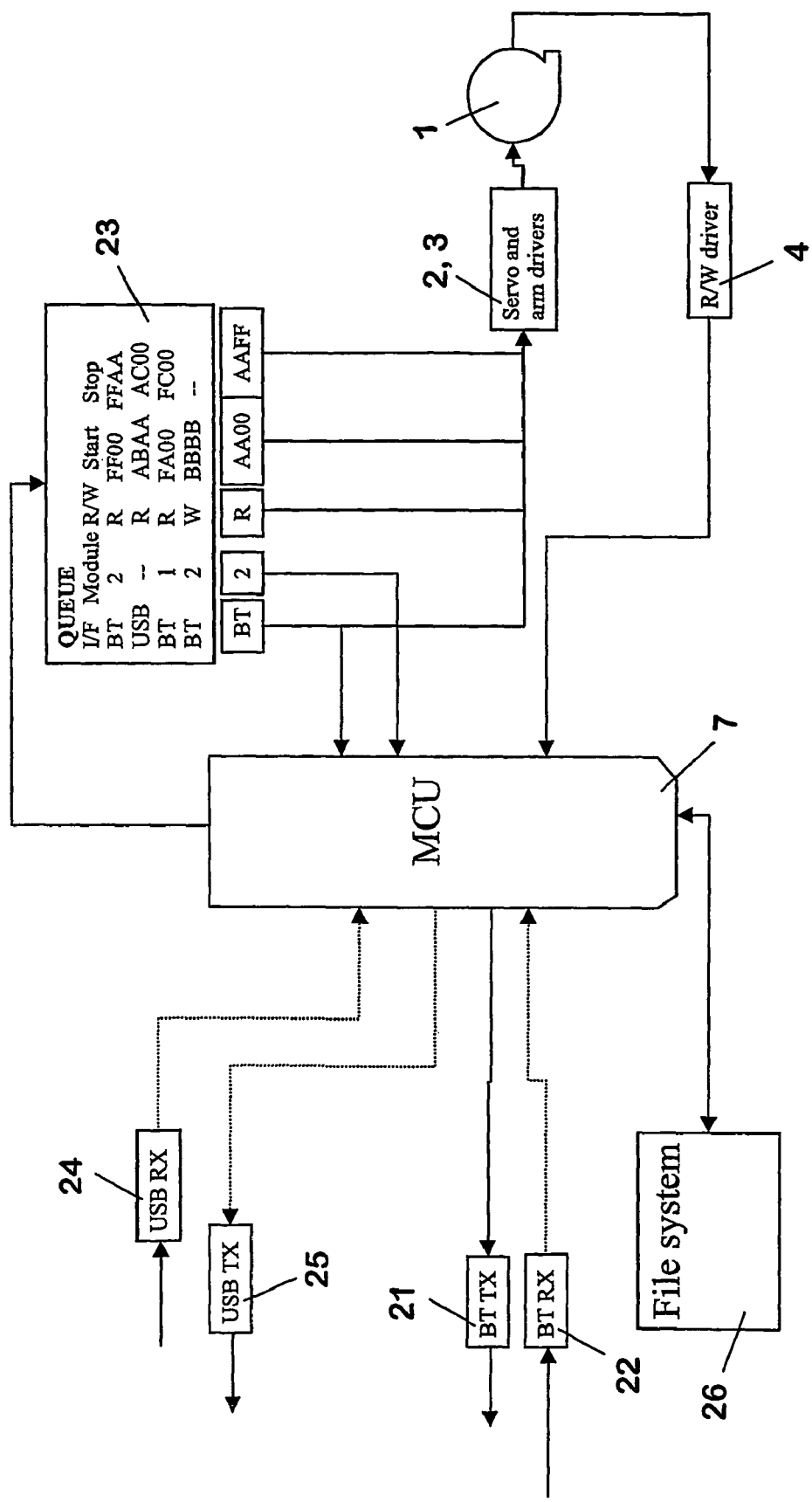
FIG. 2 illustrates logical flows for reading of data from a disk memory in an embodiment of the device according to the invention comprising multiple interfaces.
Figure 3:
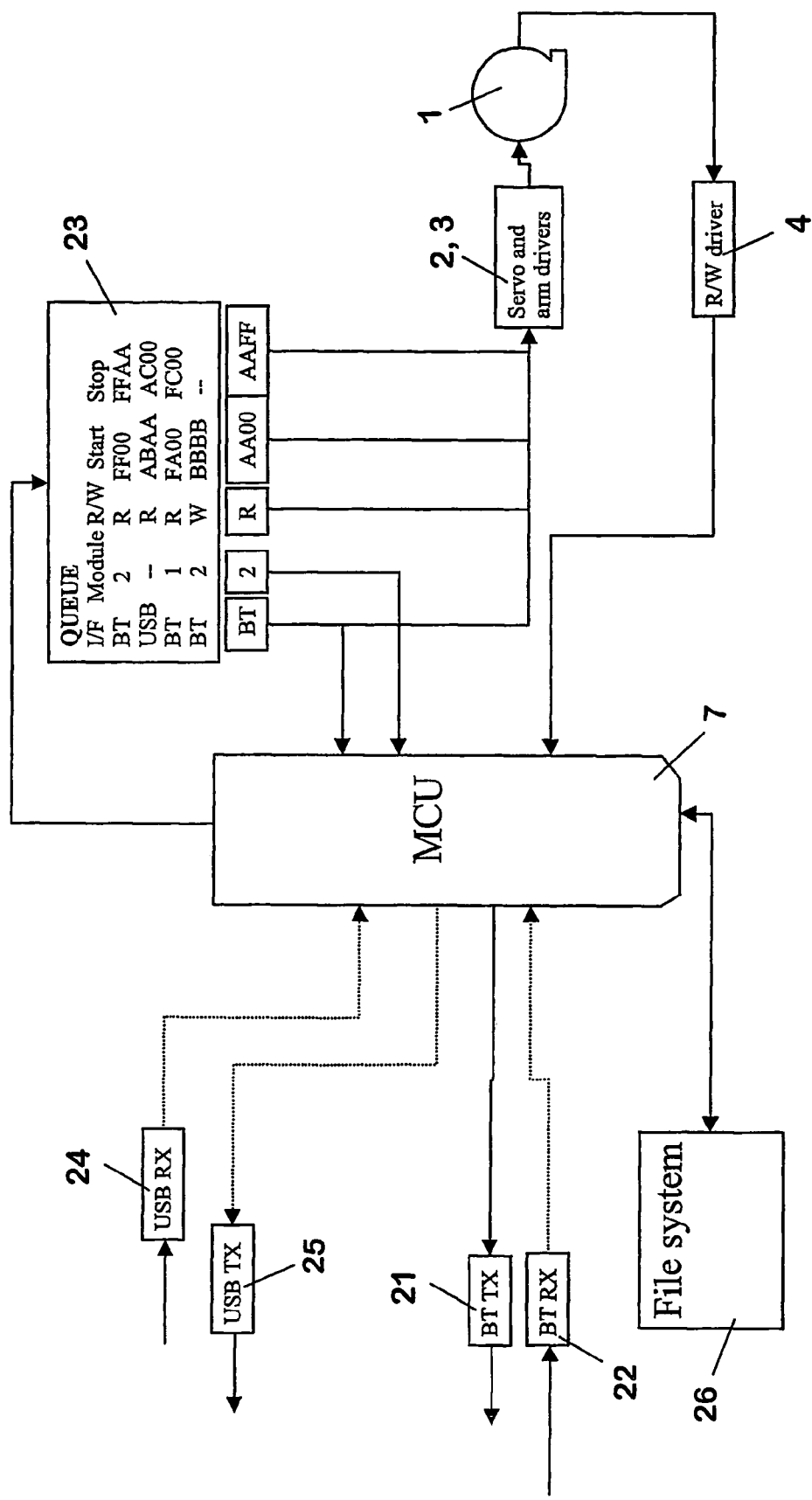
FIG. 3 illustrates logical flows for writing data to a disk memory in an embodiment of the device according to the invention comprising multiple interfaces.
Figure 4:
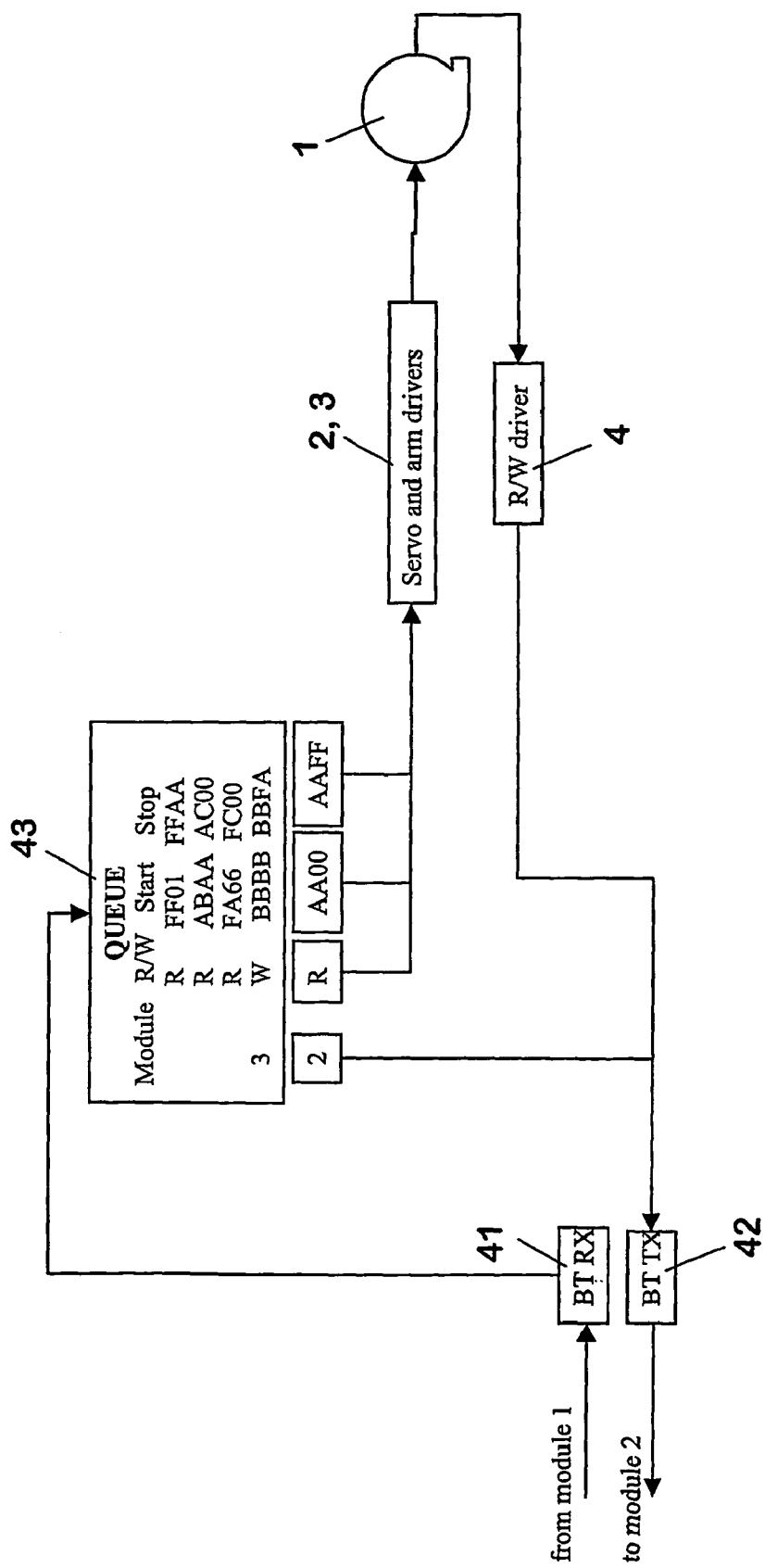
FIG. 4 illustrates the logical flows in an embodiment of the device according to the invention comprising a single interface.

Logical flows occurring during the operation in an embodiment of the device according to the invention are illustrated in more detail in FIGS. 2 to 4.

FIGS. 2 and 3 relate to the operation of a device comprising multiple interfaces. It will be assumed in the following that this device corresponds to the embodiment of FIG. 1. FIG. 2 illustrates the reading of data from a disk memory and FIG. 3 the writing of data into a disk memory. The depicted components and connections are identical in FIGS. 2 and 3. However, different inactive or waiting connections are indicated in both figures with different dotted lines.

In the embodiment of FIGS. 2 and 3, the device comprises a Bluetooth™ interface with a transmitting unit BT TX 21 and a receiving unit BT RX 22 and moreover a wired USB interface with a receiving unit USB RX 24 and a transmitting unit USB TX 25. Both interfaces are provided by the EM part 6 of the system and EM chip 5 in FIG. 1.

The different receiving and transmitting units 21, 24 and 22, 25 are connected to the MCU 7 of the system and EM chip 5 of FIG. 1. The MCU 7 is used for controlling the traffic between a disk memory and the different interfaces. A non-volatile memory 26 constituting a file system is equally connected to the MCU 7. The memory 26 can be part of the RAM 8 or the NVM 9 in FIG. 1 and comprises a file system. The file system includes a file system table which constitutes basically a file allocation table (FAT) which enables the device to communicate with the disk drive 1.

An output of the MCU 7 is connected to a queue 23. Outputs of the queue 23 are connected to the MCU 7 and to servo and arm drivers 2, 3 controlling the disk drive 1. The disk memory rotated by the disk drive 1 is further connected via an R/W driver 4 to the MCU 7.

Queuing is necessary, since the wireless interface may be too slow to accommodate all data requests immediately. In this embodiment, the maximum bandwidth is reserved for the data-transmitting route to one module, while the other modules are allowed to use only enough bandwidth to transmit read/write commands. This is one of the key factors causing an overhead in the transmissions via the air interface. Since the overhead may not be exactly constant, it may further be necessary to be able to vary the rotation speed a little bit also for a given interface.

In case the device is a mobile phone as suggested above, additional components of the mobile phone may be connected to the system and EM chips 5 of FIG. 1 for required communications specifically via the file system 26.

When read/write commands are received from modules via the receiving unit 22, 24 of one of the interfaces, the MCU checks with the file system table 26, from which place in the disk memory requested data has to be read, or to which place in the disk memory data provided by a module should be written.

In the queue 23, information is associated to each read/write command received from connected modules. The information comprises an indication of the type of the respectively used interface, an identification of the respective module in multiuser protocols, an R/W flag, an indication of where to start reading or writing and, optionally, an indication of where to stop reading or writing in the disk memory. The R/W flag indicates whether the command is a read command, identified in the figure by an "R", or a write command, identified in the figure by a "W". Since only one module at a time can be connected to the device via the USB interface, an identification of such a module is not required. This information is provided by the MCU 7 according to commands received via one of the interfaces and according to the information retrieved from the file system table 26.

In the presented embodiment, the respective information that was first provided to the queue 23 is also first retrieved from the queue 23.

In FIG. 2, the currently retrieved information indicates that the concerned interface is a Bluetooth™ interface "BT", that the information relates to a module with an identification number "2", and that data is to be read "R" from a disk memory from place "AA00" to place "AAFF". The retrieved indication of the type of the interface and the identification of the module is transmitted to the MCU 7. The indication of the type of the interface is also provided together with the R/W flag and the start and stop information to the servo and arm drivers 2, 3. The servo drivers 2 translate the received indication of the type of the concerned interface to an associated rotation speed, i.e. to a rotation speed matched to the data rate supported by the Bluetooth™ interface. This speed is lower than the rotation speed associated to the USB interface. In order to be able to translate an indication of the type of an interface to a specific rotation speed, the servo driver 2 may comprise a hard-codes rotation profile defining corresponding relations.

The servo and arm drivers 2, 3 control the rotation speed of the disk drive 1 and the position of the read/write heads in accordance with the determined rotation speed. The R/W driver 4 controls a reading of data with a corresponding data rate from place "AA00" to place "AAFF" from a disk memory rotated by the disk drive 1 and provides the read data to the MCU 7. With the indication of the concerned type of interface and of the concerned module, the MCU 7 is able to correctly initiate a transmission of the received data stream to module 2 via the transmission unit BT TX 21 of the Bluetooth™ interface. Since the data rate with which the data is received from the disk memory corresponds basically to the data rate supported by the Bluetooth™ interface, a further storing of the read data is not required.

In FIG. 3, the next set of information is retrieved from the queue 23. This information indicates that the concerned interface is again a Bluetooth™ interface "BT" and that the information relates again to a module with an identification number "2". In this case, however, data that will be provided by module 2 is to be written "W" into the disk memory beginning at place "BBBB". The indication of the type of the interface and the identification of the module is transmitted again to the MCU 7. Further, the indication of the type of the interface is provided together with the R/W flag and the start information to the servo and drivers 2, 3. The servo drivers 2 translate the received indication of the type of the concerned interface again to an associated rotation speed, as described with reference to FIG. 2.

The MCU 7 receives data from module 2 via the BT RX 22 in accordance with the information received from the queue 23 and provides the data to the R/W driver 4.

The servo and arm drivers 2, 3 control meanwhile the disk drive 1 in accordance with the determined rotation speed.

The R/W driver 4 controls a writing of the received data into a disk memory rotated by the disk drive 1 beginning at place "BBBB" with a data rate corresponding to the rotation speed set by the servo driver 2.

FIG. 4 shows logical flows in a stand-alone device which comprises only a Bluetooth™ interface and which is designed in a particularly simple way. It will be assumed in the following that this device corresponds basically to the embodiment of FIG. 1, but does not comprise a USB interface. The Bluetooth™ interface includes a receiving unit BT RX 41 and a transmitting unit BT TX 42. Via this interface, one or more Bluetooth™ modules may be connected to the device. The receiving unit 41 is connected to the input of a queue 43. The queue 43 may be contained for example in the RAM 8 of the device of FIG. 1. The output of the queue 43 is connected to the servo and arm drivers 2, 3 of FIG. 1. The servo and arm drivers 2, 3 are connected as in FIG. 1 to the disk drive 1 of the device. The disk drive 1 is equally connected to an R/W driver 4, as in FIG. 1. The output of the queue 43 is further connected together with the R/W driver 4 to the transmitting unit 42.

In the queue 43, information is stored in accordance with the read/write commands received from connected modules via the receiving unit 41. First, the device requires a unique identification for each module sending read/write commands. Therefore, the information in the queue 43 comprises an identification of the respective module providing such a command, e.g. the user ID. In FIG. 4, a specific identification is only depicted for the first two entries in the queue, for the other three entries the identification is represented by blank space. The information further comprises an R/W flag for indicating whether the command is a read command "R" or a write command "W". In case of a read command, the information comprises as well an indication of where to start and stop reading from the disk memory. In case of a write command, the information comprises instead an indication of where to start and stop writing into the disk memory.

As in the embodiment of FIGS. 2 and 3, the maximum bandwidth is reserved for the data-transmitting route to one module, while the other modules are allowed to use only enough bandwidth to transmit read/write commands.

The respective information that was first provided to the queue 43 is also first retrieved from the queue 43. In the presented example, the currently retrieved information indicates that it relates to "module 2", and that information is to be read "R" from place "AA00" to place "AAFF" of a disk memory. The identification of the module is transmitted to the transmitting unit 42, while the R/W flag and the start and stop information is provided to the servo and arm drivers 2, 3, which controls the rotation speed of the disk drive 1 and the position of the read/write heads. The rotation speed of the disk drive 1 is set more specifically such that the resulting effective data rate for reading data from or writing data to the rotating disk memory is matched to the data rate supported by the Bluetooth™ interface. The required rotation speed may be indicated e.g. by some software implemented in the device to the servo and arm drivers 2, 3. In case the data rate required for the Bluetooth™ interface is known and fixed, it may be stored for instance in the hardware (ASIC) of the device or in the NVM 9 of the system and EM chips 5 in FIG. 1.

The R/W driver 4 controls a reading of data from place "AA00" to place "AAFF" from the rotated disk memory with a corresponding data rate and provides it to the transmitting unit 42. With the indication of the concerned module received directly from the queue 43, the transmitting unit 42 is able to transmit the received data stream correctly to this module 2.

The device employed for the operations described with reference to FIG. 4 can be a particularly simple device. All information required for a data transfer is comprised in the Bluetooth™ modules connecting to the device. The connected modules know in particular the contents of the disk memory and its structure. The device does not even have to comprise the MCU 7 depicted in FIG. 1. This approach thus minimizes the required components and the complexity of the device according to the invention.

As mentioned above, the rotation speed of the disk drive 1 is always set such that-the effective data rate for reading data from or writing data to a rotating disk memory is matched to the data rate supported by the currently employed interface. The maximum data rate B in bit/s on the air interface is known. The maximum data rate of a disk memory is much higher, but for a wireless transmission such as for Bluetooth™, its effective data rate BD is set according to the invention close to B. More exactly, it is set to k*B, where k is slightly larger than 1 to accommodate overhead in the Bluetooth™ interface. It is to be noted that k will be larger for one-to-many protocols than for one-to-one protocols, since the multiuser protocol needs more overheads.

Note that in some cases, the overhead value k may not be exactly constant even for a given interface. It may vary for example with the number of attached modules in a Bluetooth™-based system. If possible, this should be avoided in the air interface by always using the smallest bandwidth for data transmission, even if the overhead is not needed.

However, even if this is impossible, this results only in small perturbations around the average value of the rotation speed ω. The simplest way to handle this problem is to recalculate k at regular intervals with a frequency much lower than the bandwidth frequency. In the case of Bluetooth™, k could be recalculated for example once a second. If the value of k has changed appreciably, then the rotation speed can be changed accordingly. However, by default such changes should be avoided, since acceleration and deceleration of the disk require the maximum amounts of energy. In general, it is preferable to set k to the minimum expected value, i.e. the HDD transmits data at a rate that is smaller than the maximum rate of the air interface. Filler bits may be needed in this case to achieve the correct air transmission speed. Although this will result in sub-optimal speeds in the air interface, the power savings are considerable. The value of k can also be set to the average expected value, but this requires a larger buffer, since at times the HDD may transmit more bits than the air interface can transmit.

It will now be shown that such an approach minimizes the power consumption of the system.

For the disk drive, the data rate is given by s=σωr, where σ is the number of bits per millimeter on the surface of the disk memory, where ω is the rotation speed of the disk memory, and where r is the radius at which the read head is located. r is assumed to be constant in the following calculations.

The power consumption is given in general by $P=\Sigma a_i \omega^{k(i)}$, where i is an index, running, in theory, from 1 to infinity, where $a_i$ is a coefficient assigned to a respective index i, and where k(i) approximates the energy function. k(i) is typically, but not always, equal to i. More specifically, this approximation is usually valid for a close to steady state operation, although it may not be valid for the spin-up and spin-down phases, in which several non-linearities occur. If k(i)=i, then k(i) is the Taylor series that approximates the energy function.

The length L of a data file can be put into relation to the data rate s and the reading time T, and thus to the rotation speed ω and the reading time T, by the equations L=sT=σωrT. The energy required for this data file is then $$E = \int_o^T P dt = \ldots = \frac{L}{\sigma r} \sum a_i \omega^{k(i)-1},$$

since P is not dependent on time. While usually k(i) is equal to i, some of the k(i) values could also be fractional. It is for instance possible that for some specific system, the energy is best approximated by an equation like $E=2.1*\omega^2+0.7*\omega^{0.7}$. In order to find the exact ω-energy profile of a system, it is necessary to use empirical estimates or calculations.

In a typical case, one component of the series dominates P (usually i=k(i)=2), leading to the approximation E1/E2≈ω1/ω2. The power consumption scales as the square, but the total expended energy scales according to the preceding relation, since the slower read mode also uses more time. Thus, it becomes apparent that decreasing the rotation speed greatly reduces the energy consumption of the system.

Strictly speaking, it is necessary for E(ω) to be monotonically increasing, which is the case for any normal system. There may be theoretical systems that have some type of gear system, in which the energy might actually locally decrease over some small range of ω. However, any such system can be described by the above equation for the energy, and does not change the fundamental idea. In theory, if the ω for a given B happens to fall within this falling range, it would be possible to optimize the energy by increasing_ω slightly so that it reaches the local minimum ω. However, this means that the disk data rate becomes larger than the air data rate, which requires the use of a larger buffer. The required size of the buffer can in theory be estimated from S=<OT>*[ω-ω], where the <OT> is a statistical estimate of the length of time that would be spent in this mode (overshoot time). This time depends on expected clip size distributions etc. In practice, such cases are so rare that there is no point in adding this complexity and extra buffering to the system.

The equation presented for the determination of energy E covers all cases, except those where there is hysteresis. Even in the case of hysteresis, it is possible to use the presented equation by writing $a_i$ in the sum as a function of time, and possibly also of ω, i.e. as $a_i=a_i(\omega,t)$. In this case, it is not possible to determine analytically how much power is saved by the proposed method. Nor is it easily possible to determine whether there are local minima of ω as mentioned above. However, even when this is possible, the task of estimating the buffer size becomes essentially impossible analytically. Thus, hysteresis will have an effect on-the amount of power savings, but even in this case the simple algorithm described above gives the best average power savings for the least complexity and the smallest system (buffer) size.

As mentioned above, the data rate of the air interface is B bit/s, and the bit rate of the disk memory BD is set for a transmission via the air interface to BD=k*B. The rotation speed ω required for achieving this data rate BD can be calculated according to the above equations to:

$$\omega = \frac{kB}{\sigma r}.$$

It is to be noted that the described embodiments constitute selected ones of a variety of possible embodiments of the invention.

The invention claimed is:

1. Device comprising
   a disk drive for rotating a disk memory;
   at least two interfaces enabling a data flow between a disk memory rotated by said disk drive and at least one other module; and
   means for setting a rotation speed of said disk drive based on an indication of a data rate supported by one of said at least two interfaces of said device, which interface is for current employment in enabling a data flow between said rotating disk memory and at least one other module.

2. Device according to claim 1, wherein said indication of a supported data rate is given by an indication of a type of said interface which is currently to be employed for enabling a data flow between said rotating disk memory and at least one other module.

3. Device according to claim 1, wherein said means for setting the rotation speed of said disk drive comprise a servo driver for controlling the rotation speed of said disk drive, and wherein said means for setting the rotation speed of said disk drive further comprise software for associating a respective indication of a supported data rate to a respective rotation speed of said disk drive, which associated rotation speed is employed by said servo driver for controlling said disk drive.

4. Device according to claim 1, wherein said means for setting the rotation speed of said disk drive comprise a servo driver controlling the rotation speed of said disk drive, wherein said servo driver comprises a hard-coded rotation profile for translating received indications of a supported data rate to a respective rotation speed of said disk drive, and wherein a rotation speed determined based on said hard-coded rotation profile is for employment by said servo driver for controlling said disk drive.

5. Device according to claim 1, wherein said means for setting the rotation speed of said disk drive set said rotation speed based in addition on a class of an application for which said data flow is required, each possible application being associated to one of at least two different classes.

6. Device according to claim 1, wherein said at least two interfaces comprise an interface enabling a connection of one other module at a time, or an interface enabling a connection of a plurality of other modules at a time.

7. Device according to claim 1, wherein said at least two interfaces comprise a wired interface, a wireless interface, or both.

8. Device according to claim 1, wherein said at least one other module is comprised in said device.

9. Device according to claim 1, wherein said at least one other module is external to said device.

10. Device according to claim 1, wherein said disk memory is a hard disk drive or an optical disk.

11. Device according to claim 1, wherein said device is a handheld terminal.

12. Method for setting a rotation speed of a disk drive of a device, which disk drive rotates a disk memory, wherein at least two interfaces of said device enable a data flow between said rotating disk memory and at least one other module, said method comprising:
   determining a rotation speed for said disk drive based on an indication of a data rate supported by one of said at least two interfaces of said device,
   which interface is for current employment in enabling a data flow between said disk memory and at least one other module; and
   setting the rotation speed of said disk drive to said determined rotation speed.

13. Method according to claim 12, wherein said indication of a supported data rate is given by an indication of a type of the respective interface.

14. Method according to claim 12, wherein said rotation speed is determined based in addition on the class of the application for which said data flow is required, each possible application being associated to one of at least two different classes.

15. A device comprising:
   a disk drive configured to rotate a disk memory;
   at least two interfaces configured to enable a data flow between said disk memory rotated by said disk drive and at least one other module; and
   a controller configured to set a rotation speed of the disk drive based on an indication of a data rate supported by one of said at least two interfaces of the device that is currently employed to enable data flow between said rotating disk memory and the at least one other module.

16. A device according to claim 15, wherein said indication of a supported data rate is given by an indication of a type of said interface which is currently employed to enable data flow between said rotating disk memory and the at least one other module.

17. Device according to claim 15, wherein said controller configured to set the rotation speed of said disk drive comprises a servo driver for controlling the rotation speed of said disk drive, and wherein said controller further comprises software for associating a respective indication of a supported data rate to a respective rotation speed of said disk drive, which associated rotation speed is employed by said servo driver for controlling said disk drive.

18. Device according to claim 15, wherein said controller configured to set the rotation speed of said disk drive comprises a servo driver controlling the rotation speed of said disk drive, wherein said servo driver comprises a hard-coded rotation profile for translating received indications of a supported data rate to a respective rotation speed of said disk drive, and wherein a rotation speed determined based on said hard-coded rotation profile is for employment by said servo driver for controlling said disk drive.

19. Device according to claim 15, wherein said controller configured to set the rotation speed of said disk drive set said rotation speed based in addition on a class of an application for which said data flow is required, each possible application being associated to one of at least two different classes.

20. Device according to claim 15, wherein said at least two interfaces comprise an interface enabling a connection of one other module at a time, or an interface enabling a connection of a plurality of other modules at a time.

* * * * *